United States Patent

[11] 3,584,144

[72] Inventors David H. Shepard
Rye;
Edward J. Gushue, Bedford Hills, both of, N.Y.

[21] Appl. No. 755,001
[22] Filed Aug. 23, 1968
[45] Patented June 8, 1971
[73] Assignee Cognitronics Corporation
Mount Risco, N.Y.

[54] REMOTE DOCUMENT SCANNER
10 Claims, 3 Drawing Figs.

[52] U.S. Cl. .......... 178/7.1, 178/7.6
[51] Int. Cl. .......... H04n 3/08
[50] Field of Search .......... 178/7.1, 7.6; 250/219 (Ide), 219 (dd), 211, 213, 227, 199; 338/15, 17, 18, 19, 252, 253

[56] References Cited

UNITED STATES PATENTS

| | | | |
|---|---|---|---|
| 3,011,089 | 11/1961 | Reynolds .......... | 178/7.2 |
| 3,325,594 | 6/1967 | Goldhammer et al. .......... | 178/7.6 |
| 3,463,882 | 8/1969 | Herbold .......... | 178/7.6 |

*Primary Examiner*—Richard Murray
*Assistant Examiner*—Alfred H. Eddleman
*Attorney*—Bryan, Parmelee, Johnson and Bollinger ABSTRACT: An optical scanning unit particularly adapted for use in remote optical character recognition systems or the like and including a document feed drum together with a rotating mirror arranged to sweep a narrow beam of light on a scan path across the drum while the latter is stationary between indexing steps, there being provided adjacent the scan path an elongate strip of semiconducting material of the PIN type arranged to produce electrical output signals in response to incident light reflected from the scanning sweep across the document, thereby to develop scan signals indicating the presence or absence of character elements along the scan path.

INVENTORS
David H. Shepard
Edward J. Gushue
BY
Robertson Bryan Parmelee & Johnson
ATTORNEYS

REMOTE DOCUMENT SCANNER

This invention relates to optical scanning equipment. More particularly, this invention relates to such equipment having means for scanning a narrow beam of light in successive sweeps across a document to sense graphic material thereon.

One prior version of such scanning equipment is described in copending application Ser. No. 624,445 filed by E. J. Gushue et al. on Mar. 20, 1967. That application discloses a document scanner wherein the light beam is projected first onto a multisegment mirror-drum which is rotated at constant velocity to produce the successive scanning beams. The document to be scanned is supported by a horizontal feed-drum which is rotated intermittently in small, incremental steps to advance the document through the scanning region. During the "dwell" period between each advancing step, the scanning beam is swept across the document in a horizontal scan path, i.e. perpendicular to the advancing movement.

Light reflected from the document during each scanning sweep is collected and concentrated on a phototube set back from the document surface, near the rotating mirror. Variations in the output of the phototube, corresponding to the presence or absence of character elements along the path of the light beam, are converted to digital signals which are stored for subsequent analysis to determine the identity of the characters on the document.

The arrangement disclosed in the above-identified copending application has functioned satisfactorily in scanning documents of relatively narrow width, e.g., up to 2 inches or so. However, adapting that arrangement for scanning documents of substantially greater size, for example, letter-sized documents 8 or 8½inches in width, introduces certain problems. One of these problems arises from the fact that the light-sensing phototube will only detect light which is received within a somewhat narrow "angle-of-acceptance." To detect light reflected from all points of a document having a substantial width, this narrow angle-of-acceptance dictates that the phototube be positioned a considerable distance away from the surface of the document. This creates awkward geometric difficulties in providing a scanner unit of acceptable size, and also in assuring collection of sufficient reflected light to realize adequate sensitivity.

Although theoretically these difficulties might be overcome by using special optical configurations to direct the reflected light to the phototube, it does not appear that such an approach would result in a really satisfactory and commercially practicable design. Thus, there has developed a need for an improved scanner based on a different approach. It is an object of the present invention to solve this problem and to provide such an improved scanner, suitable for both wide and narrow documents.

The preferred embodiment of this invention to be described in detail hereinbelow comprises a document scanner basically identical with that disclosed in the above-identified copending application Ser. No. 624,445, except that a novel arrangement has been incorporated for detecting the reflected light (as well as for producing sampling clock pulses). In accordance with an important aspect of the present invention, the reflected light is detected by an elongate strip of solid-state semiconductor material extending the full width of the document, immediately adjacent the surface thereof.

This arrangement provides a high and effectively uniform sensitivity of detection throughout the full sweep of the scan across a document of any practical width. The construction is quite simple, and eliminates the need for complex light-collecting elements. The semiconductor material does not require a high-voltage power supply, as does a conventional phototube, and provides a relatively long life of trouble-free operation.

Prior art scanning arrangements also have encountered difficulties in reading characters formed with graphite, such as from a hand-held pencil, as a result of the reflective properties of graphite. In accordance with another aspect of the present invention, this problem has been solved by the use of a polarized light source for scanning the document, in combination with a polarizing filter positioned between the document and the strip of light-detecting semiconductor material. This arrangement prevents light reflected from graphite from reaching the detector, while permitting light from the white background of the document to be sensed.

Other objects, aspects and advantages of the present invention will in part be pointed out in, and in part apparent from, the following description considered with the accompanying drawings, in which.

Figure 1:
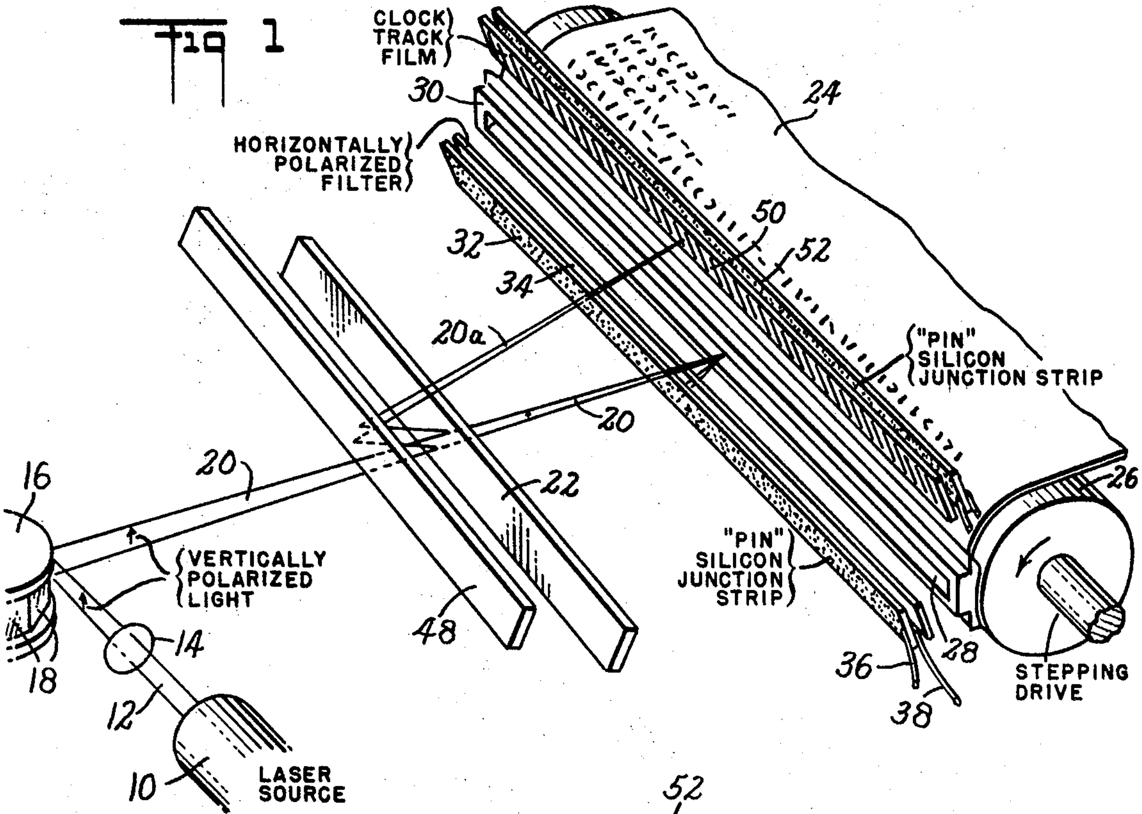
FIG. 1 is a perspective view of the basic elements of a document scanner incorporating the present invention.

Referring now to FIG. 1, there is shown a laser light source 10 arranged to project a narrow beam of vertically polarized light 12 through a focusing lens 14 and onto the surface of a mirror-drum 16. This mirror-drum rotates at constant speed and includes eight angularly related vertical plane segments 18 each arranged to produce a corresponding light beam 20 which passes through a half-silvered mirror 22 and sweeps across a paper document 24 carrying graphic characters to be read.

This document 24 is supported by a horizontal feed drum 26 rotated by a stepping motor (not shown) in incremental steps of equal angular displacement. Each step may, for example, produce a surface movement of about 0.007 inch. During the dwell time intervening each step, i.e. while the paper is stationary, the light beam 20 sweeps from one side of the paper to the other, passing through a horizontal slot 28 in a pressure pad 30. The spot of light on the paper has a diameter of about 0.007 inch. Thus, with incremental steps of approximately this same size, the entire area of the document will be scanned in a series of effectively contiguous sweeps.

In order to detect light reflected from the document 24, there is provided an elongate strip 32 of semiconducting material which produces electrical signals corresponding to incident light applied thereto. The strip 32 is mounted closely adjacent slot 28, parallel to the axis of the drum 26, and thus is spaced from the document a uniform distance throughout the entire width thereof. (The preferred embodiment also includes a polarizing filter 34 between document 24 and strip 32, for reasons which will be explained hereinbelow.)

The semiconductor strip 32 preferably comprises a large-area silicon junction providing high-efficiency conversion of light to an electrical output signal, and having a fast response to changes in light intensity. In one specific arrangement found to function with excellent results, the silicon material is coated on one side with a thin film of gold, and on the other side with a thin film of aluminum. Such a combination is sometimes referred to as "PIN" (i.e. an intrinsic resistivity region "*i*" bounded on opposite sides by thin "*p*" and "*n*" regions). Wires 36 and 38 lead from the thin films to a conventional socket arrangement (not shown) for making connection to eternal electronic equipment.

Figures 2, 3:
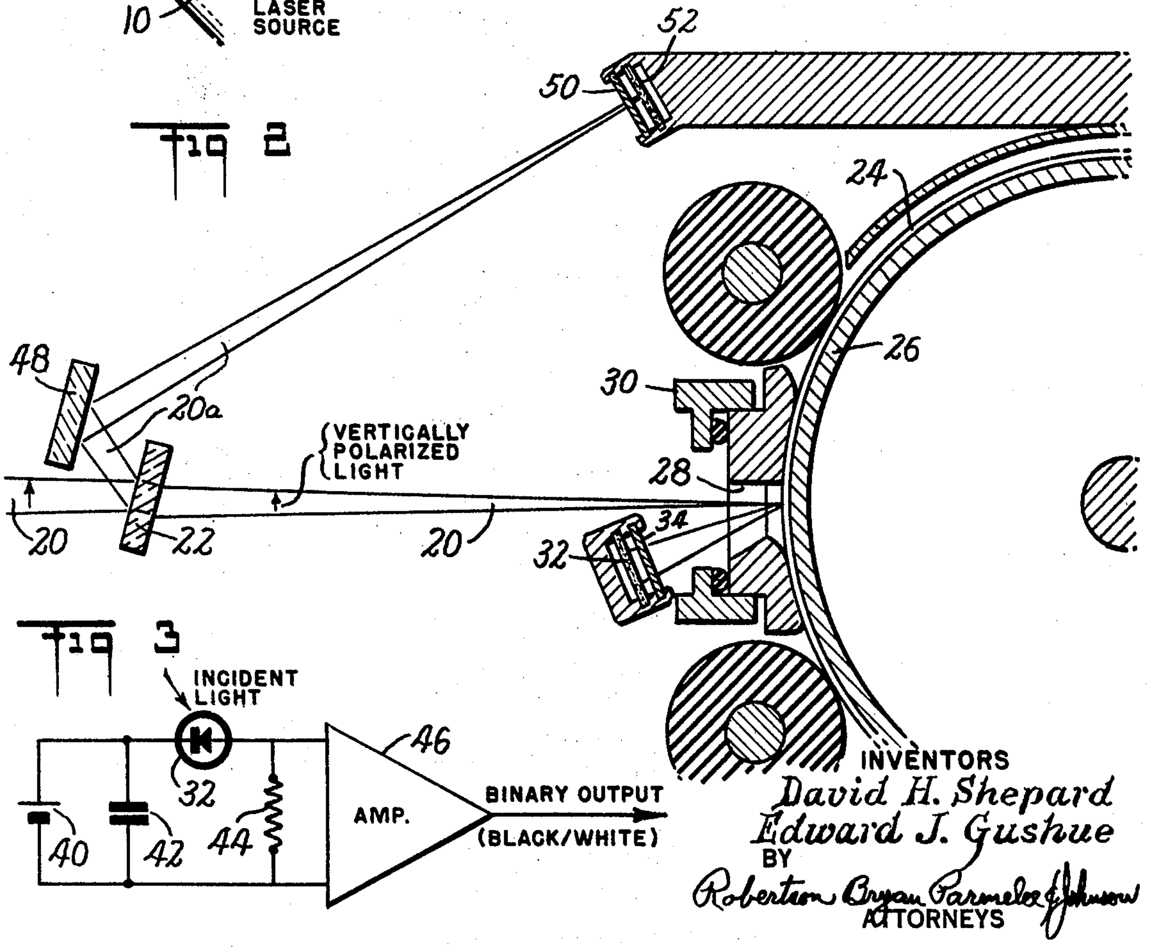
FIG. 2 is a sectional view showing certain details of the document scanner.
FIG. 3 is a diagram showing the manner in which the light-sensitive semiconductor material may be connected with associated circuit elements to provide the desired output signals.

Referring now to FIG. 3, one side of the semiconductor junction strip 32 is connected to a source of reverse-bias direct voltage 40 in parallel with a capacitor 42, and the other side is connected to a resistor 44. Current flows through this resistor in response to incident light on the strip 32. The resulting voltage signals are coupled to the input of an amplifier 46 having conventional threshold circuitry for producing a binary output signal, indicating whether the incident light is above or below a predetermined level. This binary output signal provides the basic data from which the identity of the characters on the document may be determined by known analysis techniques.

The principles of this invention also are used in developing clock pulses to "sample" the output of amplifier 46 at uniformly spaced fixed positions along the scan path. For this purpose, a portion 20A of the projected light beam 20 is reflected from the half-silvered mirror 22 rearwardly to a full mirror 48. From this mirror, the path of the light beam is inclined upwards to an elongate clock-pulse film 50 extending the full width of the document 24. This film carries a series of thin (0.007 inch) vertical bands, alternating opaque and translucent, which may be formed using conventional photographic techniques. Positioned immediately behind the film 50 is a second semiconductor strip 52, similar to that described hereinabove at 32, and adapted to produce electrical output signals in response to incident light by means of electronic circuitry such as illustrated in FIG. 3. As the principal light beam 20 sweeps across document 24, the ancillary light beam 20A sweeps across the clock-pulse film 50, thereby applying light pulses to the semiconductor strip 52 each time the beam passes one of the translucent bands of the film. Consequently, the strip 52 will produce an output signal which fluctuates in an alternating fashion as the beam 20A passes over the alternating opaque and translucent bands. This fluctuating output signal is directed to conventional shaping circuits (not shown) adapted to form sharp "sample pulses" at predetermined scan positions corresponding to the bands on the film. These sample pulses are used to gate the binary output of the amplifier 46 in a manner described in detail in the above-identified copending application Ser. No. 624,445.

The translucent bands of the film 50 preferably are formed with a frosted surface so as to cause the light to scatter somewhat after passing through the film. This tends to avoid variations in output signal which might otherwise occur due to irregularities in the semiconductor material of strip 52.

When the characters on the document 24 are formed by hand with the use of a pencil, the graphite material applied to the paper sometimes will "pile up" to present a smooth metallic surface which reflects incident light. In the past, this has caused errors in reading because the light reflected from such piled-up graphite appears to the light-detecting element much the same as light reflected from the white background of the paper. Thus, the scanner is effectively "blind" to such a reflecting character element.

This difficulty has been avoided in accordance with related aspect of the present invention by using a vertically polarized light source in combination with a horizontally polarizing filter 34 in front of the light-detecting strip 32. It has been found that light reflected from a piled-up graphite character element typically will retain its vertical polarization, and therefore will not pass through the horizontally polarizing filter.

However, light reflected from white paper will be depolarized, and thus a substantial portion of it will pass through the filter to reach the light detecting strip 32. Consequently, the scanner is enabled to distinguish graphite character elements, even though reflective.

Although a specific embodiment of this invention has been described hereinabove in detail, it is desired to emphasize that this is to illustrate the invention and is not to be considered necessarily as limiting the scope of the invention, it being understood that the invention can be modified by those skilled in this art to suit various different applications.

We claim:

1. In a document scanner comprising means to support a document in position to be scanned, means to sweep a narrow beam of light along a scan path extending across the document, means to detect the amount of light reflected from the document as the beam scans thereacross, and means to produce electrical signals responsive to the amount of reflected light at points along the scan path;

that improvement, especially adapted for scanning wide documents, wherein the light detector means comprises a large-area section of light-sensitive semiconducting material aligned with the part of said document swept by said beam of light and located closely adjacent the document along the full extent of said scan path, so as to receive light reflected from the document substantially uniformly along the entire scan path, whatever its length.

2. Apparatus as claimed in claim 1, wherein said semiconductor material is in the form of a thin film which produces a flow of current in response to incident light.

3. Apparatus as claimed in claim 2, wherein said semiconductor comprises silicon with thin film coatings on both sides; and power supply means providing a reverse bias for said semiconductor.

4. In a character reading system of the type including scanning apparatus for generating signals corresponding to data scanned from a document bearing graphic characters, the scanning apparatus comprising: (1) drum means for advancing the document in discrete incremental steps; (2) means operable between advancing steps to sweep a narrow beam of light across the document along a scan path parallel to the drum axis; and (3) means to detect the amount of light reflected from the document as the beam scans thereacross;

That improvement wherein the light detector means comprises an elongate light-sensitive strip extending parallel to the drum axis closely adjacent the scan path across the document to receive the light reflected therefrom.

5. Apparatus as claimed in claim 4, including clock track means extending parallel to said drum axis and comprising an elongate light-sensitive strip; and means to sweep a clock beam across said clock track in synchronism with said narrow beam of light.

6. Apparatus as claimed in claim 5, wherein both of said light sensitive strips comprise silicon junction devices serving as thin film photodiodes.

7. Apparatus as claimed in claim 4, wherein the light source for said narrow beam of light is a laser producing a beam which is polarized in a predetermined orientation; and a polarizing filter positioned between the document and said light-sensitive strip to discriminate against light having said predetermined orientation of polarization.

8. In a character reading system of the type including scanning apparatus for generating signals corresponding to data scanned from a document bearing graphic characters to be identified, the scanning apparatus comprising means to irradiate the document with light and means to detect the amount of light reflected from a scanning path on the document so as to produce corresponding electrical signals for character analysis;

That improvement wherein the irradiating light is polarized in a predetermined orientation; and a polarizing filter is positioned between the document and the light detector means to discriminate against reflected light having a polarization of said predetermined orientation, whereby to reduce detection of light reflected from nonabsorptive character elements such as those formed of graphite.

9. A character reading system as claimed in claim 8, wherein the light is derived from a laser to produce a narrow beam which is swept across the surface of the document.

10. A system as claimed in claim 9, wherein the reflected light is detected by an elongate strip of semiconducting material closely adjacent the scan path across the document; the polarizing filter comprising a strip parallel to said elongate strip.